US007976983B2

(12) United States Patent
Nakura

(10) Patent No.: US 7,976,983 B2
(45) Date of Patent: Jul. 12, 2011

(54) LITHIUM ION SECONDARY BATTERY

(75) Inventor: Kensuke Nakura, Osaka (JP)

(73) Assignee: Panasonic Corporation, Osaka (JP)

(*) Notice: Subject to any disclaimer, the term of this patent is extended or adjusted under 35 U.S.C. 154(b) by 733 days.

(21) Appl. No.: 11/713,719

(22) Filed: Mar. 5, 2007

(65) Prior Publication Data
US 2007/0207384 A1    Sep. 6, 2007

(30) Foreign Application Priority Data

Mar. 6, 2006   (JP) ................................ 2006-060127

(51) Int. Cl.
*H01M 4/13* (2010.01)
*H01M 4/88* (2010.01)

(52) U.S. Cl. ................... 429/231.1; 429/213; 429/218.1; 252/182.1

(58) Field of Classification Search ........................ None
See application file for complete search history.

(56) References Cited

U.S. PATENT DOCUMENTS

| 5,571,638 | A | 11/1996 | Satoh et al. | |
|---|---|---|---|---|
| 7,083,878 | B2 * | 8/2006 | Kotato et al. | 429/338 |
| 2001/0010807 | A1 * | 8/2001 | Matsubara | 423/277 |
| 2003/0148182 | A1 | 8/2003 | Park et al. | |

FOREIGN PATENT DOCUMENTS

| JP | 7-176302 A | 7/1995 |
|---|---|---|
| JP | 8-111243 A | 4/1996 |
| JP | 11-16566 A | 1/1999 |
| JP | 11-40154 A | 2/1999 |
| JP | 11-354104 A | 12/1999 |
| JP | 2000-281354 A | 10/2000 |
| JP | 2001-196063 A | 7/2001 |
| JP | 2002-367610 A | 12/2002 |
| JP | 2004-111076 A | 4/2004 |
| KR | 10-0330633 | 3/2002 |
| KR | 2002-0066548 | 8/2002 |

OTHER PUBLICATIONS

Machine translation of JP 11-354104.*
Korean Office Action issued in corresponding Korean Patent Application No. KR 10-2007-0021437, dated on Jan. 22, 2008.

* cited by examiner

*Primary Examiner* — Cynthia Lee
(74) *Attorney, Agent, or Firm* — McDermott Will & Emery LLP

(57) ABSTRACT

A lithium ion secondary battery including a positive electrode including a lithium composite oxide represented by the general formula (1): $Li_xM_{1-y}L_yO_2$ ($0.85 \leq x \leq 1.25$ and $0 \leq y \leq 0.50$; M is at least one selected from the group consisting of Ni and Co; and L is at least one selected from the group of alkaline earth elements, transition elements other than Ni and Co, rare earth elements, and elements of Group IIIb and Group IVb). The lithium composite oxide is treated with a coupling agent having a plurality of hydrolyzable groups, and the remaining hydrolyzable group is inactivated.

6 Claims, 1 Drawing Sheet

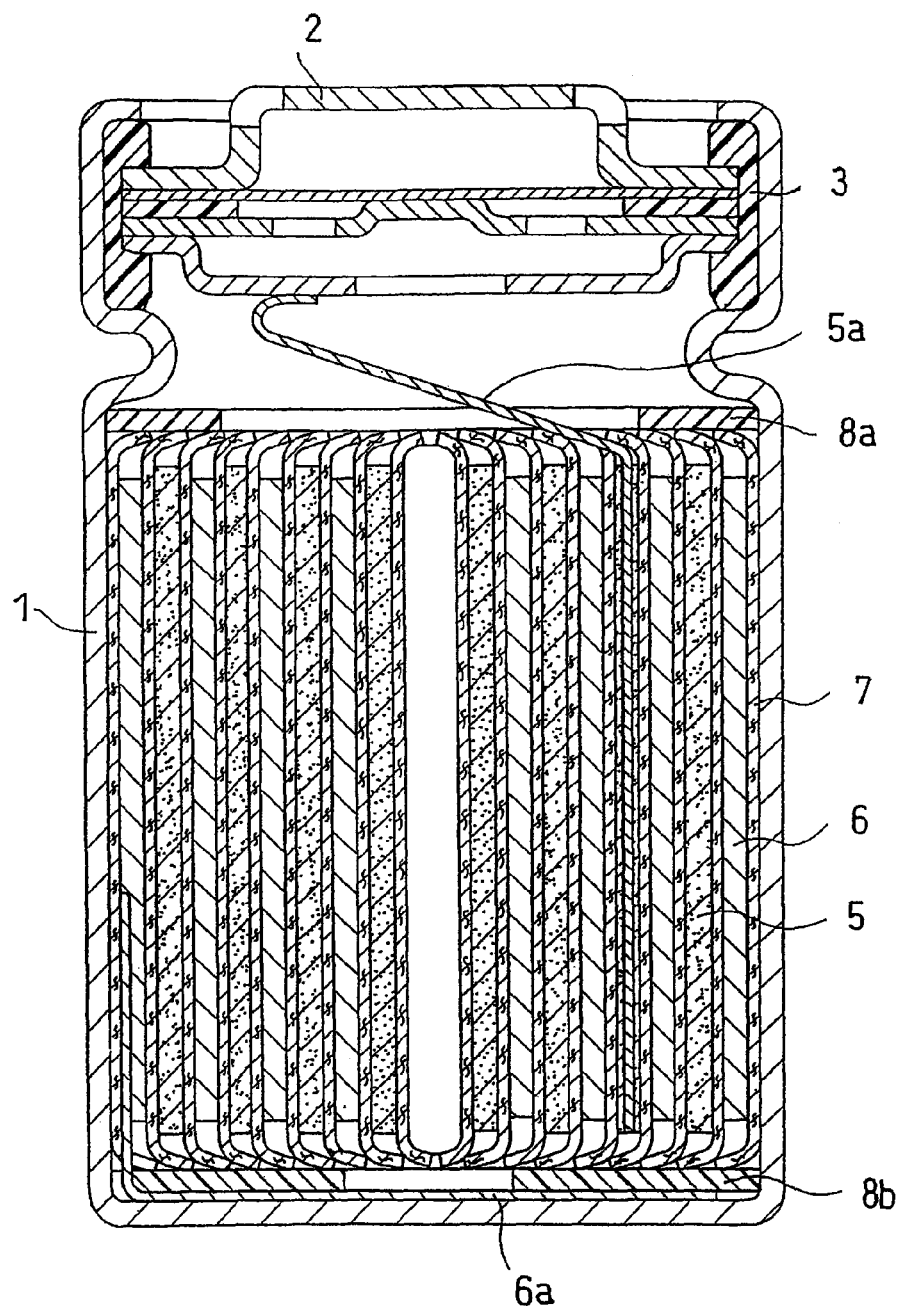

LITHIUM ION SECONDARY BATTERY

FIELD OF THE INVENTION

The present invention relates to a lithium ion secondary battery having excellent life characteristics.

BACKGROUND OF THE INVENTION

Lithium ion secondary batteries typical of non-aqueous electrolyte secondary batteries have high electromotive force and high energy density. Thus, lithium ion secondary batteries are in an increasing demand as a main power supply of mobile communication devices and portable electronic devices.

For the development of lithium ion secondary battery, it is an important technical issue to enhance the reliability of the battery. A positive electrode of lithium ion secondary battery contains a lithium composite oxide such as $Li_xCoO_2$ or $Li_xNiO_2$ (x is changeable depending on charge and discharge of battery). These lithium composite oxides contain $Co^{4+}$ or $Ni^{4+}$ having high valence and reactivity at the time of charging. Due to this, decomposition reaction of electrolyte pertaining to lithium composite oxide is accelerated in a high temperature environment, generating a gas in a battery. Consequently, sufficient cycle characteristic or storage characteristic at high temperature cannot be obtained.

In order to inhibit the reaction between an active material and an electrolyte, it is suggested to treat the surface of a positive electrode active material with a coupling agent (Japanese Patent Laid-Open Nos. 11-354104, 2002-367610, and 8-111243). This allows a stable coating to be formed on the surface of active material particle. Therefore, the decomposition reaction of electrolyte pertaining to lithium composite oxide is inhibited.

Further, from the viewpoint of inhibiting the reaction between the active material and the electrolyte and improving cycle characteristic and storage characteristic at high temperature, addition of various elements to a positive electrode active material is suggested (Japanese Patent Laid-Open Nos. 11-16566, 2001-196063, 7-176302, 11-40154, and 2004-111076).

Furthermore, improvement of water resistance is a problem regarding $Li_xNiO_2$. Therefore, it is suggested that a coupling agent is used to make the surface of $Li_xNiO_2$ hydrophobic so that the stability of the active material is enhanced (Japanese Patent Laid-Open No. 2000-281354).

The technology for inhibiting gas generation by using a coupling agent has the following points to be improved. Many of lithium ion secondary batteries are used for various portable devices. Various portable devices are not always used immediately after battery charge is completed. There are many cases wherein a battery is kept in charge condition for a long period, and thereafter discharge starts. However, the cycle life characteristic of battery is generally evaluated under a condition different from such practical use condition.

For example, a standard cycle life test is conducted in a condition wherein a short rest (intermission) period is given after charging. The rest period is about 30 minutes, for example. If such condition is applied for evaluation, the cycle life characteristic can be improved to some extent by conventionally suggested technologies.

However, it is necessary to consider that intermittent cycles are repeated on the assumption of practical use conditions. If charge-discharge cycles are repeated with a longer rest period (e.g. rest period of 720 minutes) after charging, the above technologies cannot provide sufficient life characteristic. In other words, a conventional lithium ion secondary battery still has a problem, that is improvement of intermittent cycle characteristic.

BRIEF SUMMARY OF THE INVENTION

The present invention relates to a lithium ion secondary battery that comprises a chargeable and dischargeable positive electrode, a chargeable and dischargeable negative electrode, and a non-aqueous electrolyte. The positive electrode includes an active material particle, and the active material particle includes a lithium composite oxide represented by the general formula (1): $Li_xM_{1-y}L_yO_2$, wherein $0.85 \leq x \leq 1.25$ and $0 \leq y \leq 0.50$; M is at least one selected from the group consisting of Ni and Co; and L is at least one selected from the group of alkaline earth elements, transition elements, rare earth elements, and elements of Group IIIb and Group IVb. The lithium composite oxide is treated with a coupling agent having a plurality of hydrolyzable groups and the remaining hydrolyzable group that does not form a bond with the lithium composite oxide is inactivated.

When the lithium composite oxide is treated with the coupling agent, a part of the hydrolyzable groups usually remains uncombined to the surface of the lithium composite oxide. The present invention has one feature of inactivating the remaining hydrolyzable group by various methods.

In the general formula (1), when $0<y$, L preferably includes at least one selected from the group consisting of Al, Mn, Ti, Mg, Zr, Nb, Mo, W and Y.

The coupling agent is preferably a silane coupling agent. In this case, the coupling agent binds to the lithium composite oxide via Si—O bond. Thus, on the surface of the active material particle, a silicide compound is formed.

The silane coupling agent preferably has as a hydrolyzable group at least one selected from the group consisting of alkoxy group and chlorine atom, and further preferably has at least one selected from the group consisting of mercapto group, alkyl group, and fluorine atom.

The amount of the coupling agent is preferably 2% by weight or less with respect to the lithium composite oxide.

The remaining hydrolyzable group is inactivated by a predetermined stabilizer.

The remaining hydrolyzable group is inactivated by a reaction with, for example, at least one hydroxyl group-containing substance (stabilizer) selected from the group consisting of inorganic hydroxide and inorganic oxyhydroxide. Here, as the hydroxyl group-containing substance, usable is at least one selected from the group consisting of LiOH, NaOH, manganese benzoate, and $Mn(OH)_2$.

The remaining hydrolyzable group is inactivated by reaction with, for example, a ligating (coordination) compound (stabilizer) having two or more reactive groups. In this case, each of the two or more reactive groups preferably is hydroxyl group, carbonyl group, carboxyl group, or alkoxy group.

The remaining hydrolyzable group is inactivated by a reaction with, for example, a silylating agent (stabilizer) having only one reactive group. In this case, the remaining group of the silylating agent is preferably an organic group with a carbon number of 5 or less.

In treating the lithium composite oxide with a coupling agent, a part of hydrolyzable groups of the coupling agent remains. Inactivation of the remaining hydrolyzable groups (for example, chlorine atom and alkoxy group), improves intermittent cycle properties. It is supposed that the inactivation of the remaining hydrolyzable groups inhibits removal of the coupling agent or a compound derived therefrom the active material particle.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWING

The FIGURE is a vertical cross-sectional view of a cylindrical lithium ion secondary battery according to Examples of the present invention.

DETAILED DESCRIPTION OF THE INVENTION

First, a positive electrode of the present invention is described. The positive electrode contains the following active material particles.

The active material particle contains a lithium composite oxide (Ni/Co lithium composite oxide) including nickel and/or cobalt as a main component. The form of the lithium composite oxide is not particularly limited. The lithium composite oxide forms an active material particle in a primary particle condition, and in some cases forms an active material particle in a secondary particle condition. Secondary particles may be formed by agglomeration of a plurality of active material particles.

The average particle diameter of the active material particle (or Ni/Co lithium composite oxide particle) is not particularly limited, but it is preferably 1 to 30 µm, particularly preferably 10 to 30 µm. The average particle diameter can be measured by, for example, a wet laser particle size analyzer available from Microtrac Inc. In this case, 50% value by volume (median diameter: D50) can be considered as the average particle diameter.

The Ni/Co lithium composite oxide is represented by the general formula (1) $Li_xM_{1-y}L_yO_2$. The general formula (1) satisfies $0.85 \leq x \leq 1.25$ and $0 \leq y \leq 0.50$.

Element M is at least one selected from the group of Ni and Co.

Element L is at least one selected from the group of alkaline earth elements, transition elements other than Ni and Co, rare earth elements, and elements of Group IIIb and Group IVb. Element L imparts an effect of thermal stability improvement to the lithium composite oxide. In addition, element L is considered to have an effect of enhancing binding power between the coupling agent and the lithium composite oxide. Thus, element L is preferably present more abundantly on the surface layer than inside the active material particle of the lithium composite oxide.

When 0<y, the lithium composite oxide preferably contains as elemen L at least one selected from the group consisting of Al, Mn, Ti, Mg, Zr, Nb, Mo, W and Y. These elements may be contained in the lithium composite oxide as element L either alone or in combination of two or more thereof. Among these, Al is suitable as element L since it has strong binding power with oxygen. Mn, Ti, and Nb are also suitable. If element L includes Ca, Sr, Si, Sn, B, and the like, it is preferable to include Al, Mn, Ti, Nb, and the like at the same time.

The range x representing Li content may fluctuate in accordance with charge and discharge of a battery. In the completely discharged condition, an initial condition immediately after battery assembly, or a condition immediately after the synthesis of lithium composite oxide, the range x may be $0.85 \leq x \leq 1.25$, preferably $0.93 \leq x \leq 1.1$.

The range y representing element L content may be $0 \leq y \leq 0.50$. However, when the balance of the capacity, cycle characteristic, and thermal stability is taken into consideration, the range y is preferably $0 < y \leq 0.50$, particularly preferably $0.001 \leq y \leq 0.35$.

When element L contains Al, the atom ratio a of Al with respect to the total of Ni, Co, and element L is suitably $0.005 \leq a \leq 0.1$, particularly suitably $0.01 \leq a \leq 0.08$.

When element L contains Mn, the atom ratio b of Mn with respect to the total of Ni, Co, and element L is suitably $0.005 \leq b \leq 0.5$, particularly suitably $0.01 \leq b \leq 0.35$.

When element L contains at least one selected from the group consisting of Ti and Nb, the total atom ratio c of Ti and Nb with respect to the total of Ni, Co, and element L is suitably $0.001 \leq c \leq 0.1$, particularly suitably $0.001 \leq c \leq 0.08$.

The atom ratio d of Ni with respect to the total of Ni, Co, and element L is preferably $60 \leq d \leq 90$, particularly suitably $70 \leq d \leq 85$.

The atom ratio e of Co with respect to the total of Ni, Co, and element L is preferably $5 \leq e \leq 50$, particularly suitably $10 \leq d \leq 35$.

The Ni/Co lithium composite oxide represented by the above general formula can be synthesized by sintering a raw material having a predetermined metal element ratio in an oxidizing atmosphere. The raw material includes lithium, nickel (and/or cobalt), and element L. The raw material includes oxides, hydroxides, oxyhydroxides, carbonates, nitrates, and organic complex salts of each metal element. These may be used either alone or in combination of two or more thereof.

From the viewpoint of facilitating the synthesis of Ni/Co lithium composite oxide, a solid solution containing a plurality of metal elements is preferably used. The solid solution containing a plurality of metal elements may be any of oxides, hydroxides, oxyhydroxides, carbonates, nitrates, and organic complex salts. For example, a solid solution containing Ni and Co, a solid solution containing Ni and element L, a solid solution containing Co and element L, and a solid solution containing Ni, Co, and element L are preferably used.

Temperature for sintering the raw material and oxygen partial pressure in an oxidizing atmosphere are dependent on the composition and amount of the raw material, and synthesis devices. A person skilled in the art can select appropriate conditions for them.

Other elements other than Li, Ni, Co, and element L may be mixed in industrial raw materials as impurities within such amounts that are usually contained therein. However, these impurities do not have large influences on the advantages of the present invention.

Lithium composite oxide is treated with a coupling agent having a plurality of hydrolyzable groups.

The coupling agent has at least one organic functional group and a plurality of hydrolyzable groups in a molecule thereof. The organic functional group has various hydrocarbon backbones. The hydrolyzable group imparts a hydroxyl group directly bonded to a metal atom (e.g. Si—OH, Ti—OH, and Al—OH) by hydrolysis. Examples of the functional group include alkyl group, mercaptopropyl group, and trifluoropropyl group. Examples of the hydrolyzable group include hydrolyzable alkoxy group and chlorine atom.

In the specification, "treatment with a coupling agent" means that hydroxyl groups (OH group) present on the surface of lithium composite oxide are brought into reaction with the hydrolyzable groups of the coupling agent. For example, if the hydrolyzable group is an alkoxy group (OR group: R is an alkyl group), alcohol elimination reaction proceeds between the alkoxy and hydroxyl groups. In addition, if the hydrolyzable group is a chlorine atom (Cl group), hydrogen chloride (HCl) elimination reaction proceeds between the chlorine atom and hydroxyl groups.

The presence or absence of the treatment with the coupling agent can be confirmed through the formation of X—O—Si bond (X is the surface of lithium composite oxide), X—O—Ti bond, X—O—Al bond, etc. on the surface of a lithium composite oxide. When the lithium composite oxide contains Si, Ti, Al, etc. as element L, Si, Ti, and Al constituting the lithium composite oxide differs in structure from Si, Ti, and Al derived from the coupling agent. Thus, they are distinguishable.

As the coupling agent, usable are, for example, a silane coupling agent, aluminate coupling agent, titanate coupling agent. These may be either alone or in combination of plural kinds thereof. Among these, a silane coupling agent is particularly preferable. The silane coupling agent can form an inorganic polymer having siloxane bond as backbone. Coating of the surface of the active material with such an inorganic polymer inhibits side reaction. In other words, as a result of the surface treatment, the active material particle preferably carries a silicide compound.

Further, if the reactivity of the active material particle surface with the hydroxyl group is taken into consideration, the silane coupling agent preferably has as a hydrolyzable group at least one selected from the group consisting of alkoxy group and chlorine atom. Furthermore, from the viewpoint of inhibiting the side reaction with electrolyte, the silane coupling agent preferably has an organic functional group comprising at least one kind selected from the group consisting of mercapto group, alkyl group and fluorine atom.

The amount of coupling agent to be added to lithium composite oxide is preferably 2% by weight or less, more preferably 0.05 to 1.5% by weight. With respect to the lithium composite oxide If the amount of the coupling agent to be added exceeds 2% by weight, the surface of active material particle may be excessively coated with the coupling agent that does not engage in reaction.

In the present invention, the remaining hydrolyzable groups that have not been bonded to lithium composite oxide are inactivated. In this context, "inactivation" means that the remaining hydrolyzable groups are brought into reaction to change to other structure.

For example, at least one kind of hydroxyl group-containing substance selected from the group consisting of inorganic hydroxide and inorganic oxyhydroxide is imparted to the surface of lithium composite oxide. The imparted hydroxyl group-containing substance reacts with the remaining hydrolyzable group, thereby inactivating the hydrolyzable group. In this case, it is considered that the hydrolyzable group is changed to, for example, hydroxyl group, peroxide group (OOM: M is a metal element) by the inactivation.

When hydroxyl group-containing substance is imparted to the surface of lithium composite oxide, for example, an aqueous solution or an organic solution having hydroxyl group-containing substance dissolved therein is prepared. Then, the lithium composite oxide treated with the coupling agent is dispersed in the obtained solution. Hydroxyl group-containing substance may be imparted to lithium composite oxide in advance. In this case, the lithium composite oxide that is not treated with the coupling agent is dispersed in an aqueous solution or an organic solution having hydroxyl group-containing substance dissolved therein, and then dried. Thereafter, a positive electrode is produced using the lithium composite oxide having hydroxyl group-containing substance, and the obtained positive electrode is treated with the coupling agent. The concentration of hydroxyl group-containing substance in an aqueous solution or an organic solution having hydroxyl group-containing substance dissolved therein is preferably 0.002 to 0.5 mol/L.

As the hydroxyl group-containing substance, usable are, for example, LiOH, NaOH, manganese benzoate, and $Mn(OH)_2$. These may be used either alone or in combination of plural kinds thereof.

The remaining hydrolyzable group can be inactivated by imparting a ligating compound having two or more reactive groups to the surface of lithium composite oxide. In this case, the imparted ligating compound reacts with the remaining hydrolyzable group. Specifically, two or more reactive groups of the ligating compound simultaneously react with two or more hydrolyzable groups. As a result, the hydrolyzable groups are inactivated. Each of two or more reactive groups of the ligating compound is preferably hydroxyl group, carbonyl group, carboxyl group, or alkoxy group. Further, two or more reactive groups are preferably the same kind of group.

In this invention, the ligating compound is a compound that can form the coordination compound reacting with the hydrolyzable group of the coupling agent. Examples of the ligating compound include β-diketone, alkanolamine, α-hydroxyketone, acid anhydrides, and diols. Particularly preferable are maleic acid, maleic anhydride, ethyl acetoacetate (β-diketone), 2,4-pentadion (β-diketone), triethanol amine (alkanolamine), 2-amino-2-methyl-1-propanol (alkanolamine), 4-hydroxy-2-butanone (α-hydroxyketone), 3-hydroxy-2-pentanone (α-hydroxyketone), 1-phenyl-1-oxo-2-hydroxypropane (α-hydroxyketone), phthalic anhydride (acid anhydride), and fumaric anhydride (acid anhydride).

Further, a silylating agent may be imparted to the surface of lithium composite oxide. Preferably, the silylating agent has only one reactive group and the remaining group is an organic group with a carbon number of 5 or less. In this case, the imparted silylating agent reacts with the remaining hydrolyzable group. As a result, the hydrolyzable group is inactivated. Examples of the reactive group of the silylating agent include alkoxy group, chlorine atom, and mercapto group. Further, as the organic group with a carbon number of 5 or less, preferable are methyl group, ethyl group, propyl group, and pentyl group. Specific examples of the silylating agent include trialkylchlorosilane and trialkylalkoxysilane.

When a ligating compound or a silylating agent is imparted to the surface of lithium composite oxide, an aqueous solution or an organic solution having the ligating compound or the silylating agent dissolved therein, for example, is prepared. The lithium composite oxide treated with the coupling agent is dispersed in the obtained solution. The concentration of the ligating compound or silylating agent in the solution is preferably 0.01 to 2 mol/L.

Next, one exemplary method for producing a positive electrode is described.

(i) First Step

First, a lithium composite oxide represented by the general formula (1): $Li_xM_{1-y}L_yO_2$ is prepared. The method for preparing the lithium composite oxide is not particularly limited. The lithium composite oxide can be synthesized by, for example, sintering a raw material having a predetermined metal element ratio in an oxidizing atmosphere. Sintering temperature, oxygen partial pressure in an oxidizing atmosphere, or the like may properly be selected depending on the composition and amount of a raw material, and the synthesis device.

(ii) Second Step

The obtained lithium composite oxide is treated with a coupling agent. The treatment method is not particularly limited. For example, only addition of the coupling agent to the lithium composite oxide is sufficient. However, it is preferable to allow the coupling agent to conform to the entire of lithium composite oxide. From this viewpoint, it is desirable to disperse the lithium composite oxide in a solution or a dispersion solution of the coupling agent, and thereafter to remove a solvent. It is preferable to stir the lithium composite oxide, for example, in the solution or dispersion solution of coupling agent at 20° C. to 40° C. for 5 to 60 minutes.

The solvent for dissolving or dispersing the coupling agent is not particularly limited, but preferable are: ketones such as dioxane, acetone, and methyl ethyl ketone (MEK); ethers such as tetrahydrofuran (THF); alcohols such as ethanol; N-methyl-2-pyrrolidone (NMP), and the like. Further, an alkaline water with pH of 10 to 14 is usable.

(iii) Third Step

The lithium composite oxide is immersed in a solution or a dispersion solution containing a hydroxyl group-containing substance, a ligating compound, or a silylating agent. This allows the remaining hydrolyzable groups to be inactivated.

(iv) Fourth Step

After the inactivation of the remaining hydrolyzable groups of the coupling agent, a mixture for positive electrode containing active material particles, a conductant agent, and a binder is dispersed in a liquid component to prepare a paste. The obtained paste is applied and dried onto a positive electrode core material (current collector for positive electrode), thereby obtaining a positive electrode. Temperature and time period for drying after the application of the paste onto the positive electrode core material are not particularly limited. It is sufficient to conduct the drying, for example, at approximately 100° C. for about 10 minutes.

In the lithium composite oxide, it is preferable that element L exists more abundantly on the surface layer than inside the active material particle. For example, the lithium composite oxide before the coupling treatment is allowed to carry a raw material for element L, and then the lithium composite oxide is sintered.

The sintering is conducted at 650° C. to 750° C. for 2 to 24 hours (preferably about 6 hours) in an oxygen or air atmosphere. In this case, the pressure of the oxygen atmosphere is preferably 10 kPa to 50 kPa. By this sintering process, it is possible to obtain an active material particle having element L on the surface layer more abundantly than the inside thereof.

As a binder to be included in the mixture for positive electrode, any of thermoplastic resins and thermosetting resins may be used, but thermoplastic resins are preferable. Examples of thermoplastic resins usable as a binder include polyethylene, polypropylene, polytetrafluoroethylene (PTFE), polyvinylidene fluoride (PVDF), styrene butadiene rubber, tetrafluoroethylene-hexafluoropropylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinyl ether-tetrafluoroethylene copolymer, ethylene-acrylic acid copolymer, ethylene-methacrylic acid copolymer, ethylene-methylacrylate copolymer, and ethylene-methylmethacrylate copolymer. These may be used alone or in combination of two or more thereof. These may be used in the form of a cross-linked material with sodium ion or the like.

As the conductive material to be included in the mixture for positive electrode, any electronically conductive material may be used as long as it is chemically stable in a battery. Examples thereof include graphites such as natural graphite (scale-shaped graphite or the like) and artificial graphite; carbon blacks such as acetylene black, ketjen black, channel black, furnace black, lamp black, and thermal black; conductive fiber such as carbon fiber and metal fiber; metallic powders such as aluminum; conductive whiskers such as zinc oxide and potassium titanate; conductive metal oxide such as titanium oxide; organic conductive materials such as polyphenylene derivative; and carbon fluoride. These may be used alone or in combination of two or more thereof. The amount of the conductive material to be added is not particularly limited, but it is preferably 1 to 50% by weight, more preferably 1 to 30% by weight, particularly preferably 2 to 15% by weight with respect to the active material particle contained in the mixture for positive electrode.

As the positive electrode core material (current collector for positive electrode), any electronically conductive material may be used as long as it is chemically stable in a battery. Usable are foils or sheets composed of, for example, aluminum, stainless steel, nickel, titanium, carbon, and conductive resin. Among these, aluminum foil, aluminum alloy foil, and the like are particularly preferable. On the surface of foil or sheet, a layer of carbon or titanium may be imparted or an oxide layer may be formed. Irregularities may be imparted to the surface of foil or sheet. The current collector may be used in the form of, for example, net, punched sheet, lath member, porous member, foam, and molded article of fibers. The thickness of the positive electrode core material is not particularly limited, but within a range of 1 to 500 µm, for example.

The method for treating an active material particle composed of lithium composite oxide has been described above. Next, a method for treating an electrode plate is described.

(i) First Step

A lithium composite oxide represented by the general formula (1): $Li_xM_{1-y}L_yO_2$ is prepared in the same manner in the case of treating an active material particle composed of lithium composite oxide with a coupling agent.

(ii) Second Step

The obtained lithium composite oxide is immersed in a solution of a hydroxyl group-containing substance, a ligating compound, or a silylating agent, and thereafter dried. This process allows a hydroxyl group-containing substance, a ligating compound, or a silylating agent to be attached to the lithium composite oxide.

(iii) Third Step

A mixture for positive electrode containing the obtained active material particle, a conductive agent, and a binder is dispersed in a liquid component to prepare a paste. The obtained paste is applied and dried onto a positive electrode core material (current collector for positive electrode), thereby obtaining a positive electrode. Temperature and time period for drying after the application of the paste onto the positive electrode core material are not particularly limited, but it is sufficient to conduct the drying, for example, at approximately 100° C. for about 10 minutes.

The hydroxyl group-containing substance, ligating compound, or silylating agent may be added to a paste before the paste is applied onto the positive electrode core material. In this case, second step can be omitted.

(iv) Fourth Step

The positive electrode containing the hydroxyl group-containing substance, ligating compound, or silylating agent is treated with a coupling agent. A treatment method is not particularly limited. For example, the positive electrode is immersed in a coupling agent for 5 to 10 minutes, and then dried at 110° C. for about 10 minutes. However, it is preferable to allow the coupling agent to conform to the entire of lithium composite oxide. From this viewpoint, it is desirable to use a solution or dispersion solution containing the coupling agent.

The solvent for dissolving or dispersing the coupling agent is not particularly limited, but preferable are: ketones such as dioxane, acetone, and methyl ethyl ketone (MEK); ethers such as tetrahydrofuran (THF); alcohols such as ethanol; N-methyl-2-pyrrolidone (NMP), and the like. Further, an alkaline water with pH of 10 to 14 is usable.

In the case for allowing element L to exist more abundantly on the surface layer than inside the active material particle, the active material particle is prepared in the same manner as in the case for treating the active material particle with the coupling agent.

As the binder, conductive material, and positive electrode core material (current collector for positive electrode), materials that are described for the case for treating the active material particle with the coupling agent can be used.

Hereafter, constituent elements other than positive electrode of the lithium ion secondary battery of the present invention are described. However, the lithium ion secondary battery has a feature of including the above-described positive electrode, and the other constituent elements are not particularly limited. Therefore, the following descriptions do not restrict the present invention.

As a lithium-chargeable and dischargeable negative electrode, a negative electrode core material carrying a mixture for negative electrode can be used. The mixture for negative electrode includes, for example, a negative electrode active material and a binder, and as an optional component, includes a conductive material and a thickener. A negative electrode of this kind can be produced in the same manner as the positive electrode.

The negative electrode active material may be a material that can electrochemically charge and discharge lithium. For example, graphite, hard-to-graphitize carbon materials, lithium alloys, metal oxides, and the like can be used. The lithium alloy is preferably an alloy containing at least one selected from the group consisting of silicon, tin, aluminum, zinc, and magnesium. The metal oxide is preferably a silicon-containing oxide or a tin-containing oxide, and it is more preferable that the metal oxide is hybridized with a carbon material. The average particle size of the negative electrode active material is not particularly limited, but is preferably 1 to 30 μm.

As a binder to be included in the mixture for negative electrode, any of thermoplastic resins and thermosetting resins may be used, but thermoplastic resins are preferable. Examples of thermoplastic resins usable as a binder include polyethylene, polypropylene, polytetrafluoroethylene (PTFE), polyvinylidene fluoride (PVDF), styrene butadiene rubber, tetrafluoroethylene-hexafluoropropylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinyl ether-tetrafluoroethylene copolymer, ethylene-acrylic acid copolymer, ethylene-methacrylic acid copolymer, ethylene-methyl acrylate copolymer, and ethylene-methyl methacrylate copolymer. These may be used alone or in combination of two or more thereof. These may be used in the form of a cross-linked material with sodium ion or the like.

As the conductive material to be included in the mixture for negative electrode, any electronically conductive material may be used as long as it is chemically stable in a battery. Examples thereof include graphites such as natural graphite (scale-shaped graphite or the like) and artificial graphite; carbon blacks such as acetylene black, ketjen black, channel black, furnace black, lamp black, and thermal black; conductive fiber such as carbon fiber and metal fiber; metallic powders such as copper and nickel; and organic conductive materials such as polyphenylene derivative. These may be used alone or in combination of two or more thereof. The amount of the conductive material to be added is not particularly limited, but it is preferably 1 to 30% by weight, more preferably 1 to 10% by weight with respect to the active material particle contained in the mixture for negative electrode.

As the negative electrode core material (current collector for negative electrode), any electronically conductive material may be used as long as it is chemically stable in a battery. Usable are foils or sheets composed of, for example, stainless steel, nickel, copper, titanium, carbon, and conductive resin. Among these, copper foil, copper alloy foil, and the like are particularly preferable. On the surface of foil or sheet, a layer of carbon, titanium, or nickel may be imparted or an oxide layer may be formed. Irregularities may be imparted to the surface of foil or sheet. The current collector may be used in the form of, for example, net, punched sheet, lath member, porous member, foam, and molded article of fibers. The thickness of the negative electrode core material is not particularly limited, but within a range of 1 to 500 μm, for example.

As a non-aqueous electrolyte, preferably used is a non-aqueous solvent having a lithium salt dissolved therein.

Examples of the solvent include cyclic carbonates such as ethylene carbonate (EC), propylene carbonate (PC), and butylene carbonate (BC); chain carbonates such as dimethyl carbonate (DMC), diethyl carbonate (DEC), ethylmethyl carbonate (EMC), and dipropyl carbonate (DPC); aliphatic carboxylic acid esters such as methyl formate, methyl acetate, methyl propionate, and ethyl propionate; lactones such as γ-butyrolactone and γ-valerolactone; chain ethers such as 1,2-dimethoxy ethane (DME), 1,2-diethoxy ethane (DEE), and ethoxymethoxy ethane (EME); cyclic ethers such as tetrahydrofuran and 2-methyltetrahydrofuran; dimethyl sulfoxide; 1,3-dioxolane; formamide; acetamide; dimethylformamide; dioxolane; acetonitrile; propylnitrile; nitromethane; ethyl monoglyme; phosphate trimester; trimethoxy methane; dioxolane derivative; sulfolane; methyl sulfolane; 1,3-dimethyl-2-imidazolidinone; 3-methyl-2-oxazolidinone; propylene carbonate derivative; tetrahydrofuran derivative; ethyl ether; 1,3-propanesultone; anisole; dimethyl sulfoxide; or N-methyl-2-pyrrolidone. These may be used alone but preferably two or more thereof may be mixed for use. Among these, preferable is a mixture solvent of a cyclic carbonate and a chain carbonate, or a mixture solvent of a cyclic carbonate, a chain carbonate, and an aliphatic carboxylic acid ester.

Examples of the lithium salt to be dissolved in the non-aqueous solvent include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carbonate, $LiBr$, $LiI$, $LiBCl_4$, lithium tetraphenylborate, and lithium imide salts. These may be used either alone or in combination of two or more thereof. However, at least $LiPF_6$ is preferably used. The dissolution amount of the lithium salt with respect to the non-aqueous solvent is not particularly limited, but the concentration of lithium salt is preferably 0.2 to 2 mol/L, more preferably 0.5 to 1.5 mol/L.

For the purpose of improving charge-discharge properties of a battery, various additives can be added to the non-aqueous electrolyte. Examples of the additive include triethylphosphate, triethanolamine, cyclic ethers, ethylenediamine, n-glyme, pyridine, hexaphosphate triamide, nitrobenzene derivatives, crown ethers, quaternary ammonium salts, and ethylene glycol dialkylether.

From the viewpoint of improving intermittent cycle properties, at least one additive selected from the group consisting of vinylene carbonate, vinylethylene carbonate, phosphazene, and fluorobenzene is preferably added to the non aqueous electrolyte. An appropriate content of these additives is 0.5 to 10% by weight of the non-aqueous electrolyte.

It is necessary to dispose a separator between the positive and negative electrodes. As the separator, an insulating fine porous thin film having high ion permeability and predetermined mechanical strength is preferably used. It is preferable that the separator has a function to close pores at a predetermined temperature or higher to increase resistance. As a material for the fine porous thin film, preferably used is polyolefin such as polypropylene and polyethylene, which has excellent resistance to organic solvents and hydrophobicity. A sheet, a nonwoven cloth, a woven cloth, and the like made of glass fiber are also used. The separator has a pore diameter of 0.01 to 1 µm, for example. The separator generally has a thickness of 10 to 300 µm. The separator generally has a porosity of 30 to 80%.

Instead of the separator, a non-aqueous electrolyte and a polymer material (polymer electrolyte) holding the electrolyte can be used. In this case, the polymer electrolyte is used integrally with the positive or negative electrode. As long as the polymer material can hold the non-aqueous electrolyte, any polymer material is usable, but a copolymer of vinylidene fluoride and hexafluoropropylene is particularly preferable.

Next, the present invention will be described in detail based on Examples, but the present invention is not limited to the following Examples.

EXAMPLE 1

Battery A1
(i) Synthesis of Lithium Composite Oxide

A mixture of nickel sulfate, cobalt sulfate, and aluminum sulfate was prepared such that a molar ratio of Ni atom, Co atom, and Al atom is 80:15:5, and 3 kg of the mixture was dissolved in 10 L of water, obtaining a raw material solution. To the raw material solution, 400 g of sodium oxide was added to produce a precipitate. The precipitate was well washed with water and dried to obtain a co-precipitated hydroxide. A predetermined amount of lithium hydroxide was mixed with 3 kg of the obtained Ni—Co—Al co-precipitated hydroxide, and sintered in an atmosphere with an oxygen partial pressure of 0.5 atmospheric pressure at a synthesis temperature of 750° C. for 10 hours to obtain a Ni/Co lithium composite oxide containing Al as element L ($LiNi_{0.8}Co_{0.15}Al_{0.05}O_2$).

(ii) Synthesis of Active Material Particle

The obtained composite oxide was treated with a coupling agent, and thereafter with a LiOH aqueous solution. Specifically, 2 kg of Ni/Co lithium composite oxide and 0.5% by weight of 3-mercaptopropyltrimethoxysilane with respect to the Ni/Co lithium composite oxide were inputted into 10 L of dehydrated dioxane, and the obtained dispersion solution was stirred at 25° C. for 3 hours. Then, 2 L of 0.2% by weight of LiOH aqueous solution was added to the dispersion solution, and further stirred at 25° C. for 2 hours. Thereafter, the composite oxide was filtrated, washed well with acetone, and dried at 100° C. for 2 hours.

In the obtained active material particle, the remaining hydrolyzable group (methoxy group) of the coupling agent is considered to be inactivated by reaction with LiOH added as a stabilizer.

(iii) Production of Positive Electrode 1 kg of the obtained active material particles (average particle diameter 12 µm), 0.5 kg of PVDF #1320 (a solution of N-methyl-2-pyrrolidone (NMP) with a solid content of 12% by weight) available from Kureha Chemical Industry Co., Ltd., 40 g of acetylene black, and an appropriate amount of NMP were stirred with a double-arm kneader to prepare a mixture paste for positive electrode. This paste was applied onto both sides of an aluminum foil with a thickness of a 20 µm (positive electrode core material), and dried. After drying, the obtained foil was rolled so as to have a total thickness of 160 µm. Thereafter, the obtained electrode plate was slit to have such a width that it could be inserted into a 18650 cylindrical battery case, obtaining a positive electrode.

(iv) Production of Negative Electrode 3 kg of artificial graphite, 200 g of BM-400B available from Zeon Corporation (a dispersion solution of modified styrene-butadiene rubber with a solid content of 40% by weight), 50 g of carboxymethyl cellulose (CMC), and an appropriate amount of water were stirred with a double-arm kneader to prepare a mixture paste for negative electrode. This paste was applied to onto both sides of a copper foil with a thickness of 12 µm (negative electrode core material), dried, and rolled so as to have a total thickness of 160 µm. Thereafter, the obtained electrode plate was slit to have such a width that it could be inserted into a 18650 cylindrical battery case, obtaining a negative electrode.

(v) Preparation of Non-Aqueous Electrolyte

A mixed solvent of ethylene carbonate and methyl ethyl carbonate was prepared at a capacity ratio of 10:30. To the mixed solvent, 2% by weight of vinylene carbonate, 2% by weight of vinylethylene carbonate, 5% by weight of fluorobenzene, and 5% by weight of phosphazene were added, obtaining a mixed solution. $LiPF_6$ was dissolved in this mixed solution at a concentration of 1.5 mol/L, obtaining a non-aqueous electrolyte.

(vi) Assembly of Battery

As shown in the FIGURE, a positive electrode 5 and a negative electrode 6 were wound via a separator 7 to form a group of electrode plates with a spiral shape. As the separator 7, a composite film of polyethylene and polypropylene (2300 available from Celgard Inc. with a thickness of 25 µm) was used.

A positive lead 5a and a negative lead 6a both made of nickel were attached to the positive and negative electrodes 5 and 6, respectively. This group of electrode plates has an upper insulating plate 8a and a lower insulating plate 8b arranged on upper and lower faces thereof, and inserted into a battery case 1. Further, 5 g of the non-aqueous electrolyte was injected in the battery case 1.

Thereafter, a sealing plate 2 with an insulating gasket 3 arranged therearound and the positive electrode lead 5a were brought into conduction, and an opening of the battery case 1 was sealed with the sealing plate 2. Accordingly, a 18650 cylindrical lithium ion secondary battery (design capacity: 2000 mAh) was completed. This battery was used as an example Battery A1.

Battery A2
A lithium ion secondary battery was produced in the same manner as in Battery A1 except that an aqueous solution with 0.2% by weight of NaOH was used to inactivate the remaining hydrolyzable group of the coupling agent instead of an aqueous solution with 0.2% by weight of LiOH.

Battery A3
A lithium ion secondary battery was produced in the same manner as in Battery A1 except that an aqueous solution with 0.2% by weight of KOH was used to inactivate the remaining hydrolyzable group of the coupling agent instead of an aqueous solution with 0.2% by weight of LiOH.

Battery A4
A lithium ion secondary battery was produced in the same manner as in Battery A1 except that composite oxide having been treated with a coupling agent was treated with ethyl acetoacetate (β-diketone) to inactivate the remaining hydrolyzable group. Specifically, 2 kg of Ni/Co lithium composite oxide and 0.5% by weight of 3-mercaptopropyltrimethoxysilane with respect to Ni/Co lithium composite oxide were inputted into 10 L of dehydrated dioxane, and the obtained dispersion solution was stirred at 25° C. for 3 hours. Then, 0.2% by weight of ethyl acetoacetate with respect to the composite oxide was added to the dispersion solution, and further stirred at 25° C. for 2 hours, thereby inactivating the remaining hydrolyzable group. Thereafter, the composite oxdies were filtrated, washed with acetone, and dried at 100° C. for 2 hours.

Battery A5
A lithium ion secondary battery was produced in the same manner as in Battery A4 except that 2,4-pentadion(β-diketone) was used to inactivate the remaining hydrolyzable group of the coupling agent instead of ethyl acetoacetate.

Battery A6
A lithium ion secondary battery was produced in the same manner as in Battery A4 except that triethanol amine(alkanolamine) was used to inactivate the remaining hydrolyzable group of the coupling agent instead of ethyl acetoacetate.

Battery A7
A lithium ion secondary battery was produced in the same manner as in Battery A4 except that 2-amino-2-methyl-1-propanol(alkanolamine) was used to inactivate the remaining hydrolyzable group of the coupling agent instead of ethyl acetoacetate.

Battery A8
A lithium ion secondary battery was produced in the same manner as in Battery A4 except that 4-hydroxy-2-butanone (α-hydroxyketone) was used to inactivate the remaining hydrolyzable group of the coupling agent instead of ethyl acetoacetate.

Battery A9
A lithium ion secondary battery was produced in the same manner as in Battery A4 except that 3-hydroxy-2-pentanone (α-hydroxyketone) was used to inactivate the remaining hydrolyzable group of the coupling agent instead of ethyl acetoacetate.

Battery A10
A lithium ion secondary battery was produced in the same manner as in Battery A4 except that 1-phenyl-1-oxo-2-hydroxypropane(α-hydroxyketone) was used to inactivate the remaining hydrolyzable group of the coupling agent instead of ethyl acetoacetate.

Battery A11
A lithium ion secondary battery was produced in the same manner as in Battery A4 except that maleic anhydride (acid anhydride) was used to inactivate the remaining hydrolyzable group of the coupling agent instead of ethyl acetoacetate.

Battery A12
A lithium ion secondary battery was produced in the same manner as in Battery A4 except that phthalic anhydride (acid anhydride) was used to inactivate the remaining hydrolyzable group of the coupling agent instead of ethyl acetoacetate.

Battery A13
A lithium ion secondary battery was produced in the same manner as in Battery A4 except that fumaric anhydride (acid anhydride) was used to inactivate the remaining hydrolyzable group of the coupling agent instead of ethyl acetoacetate.

Battery A14
A lithium ion secondary battery was produced in the same manner as in Battery A4 except that trimethylchlorosilane (silylating agent) was used to inactivate the remaining hydrolyzable group of the coupling agent instead of ethyl acetoacetate.

Battery A15
A lithium ion secondary battery was produced in the same manner as in Battery A4 except that tripentylchlorosilane (silylating agent) was used to inactivate the remaining hydrolyzable group of the coupling agent instead of ethyl acetoacetate.

[Evaluation 1]
(Discharge Characteristic)
Pre-conditioning charge and discharge were conducted for each battery, followed by storage for 2 days under an environment at 40° C. Thereafter, each battery was subjected to the following two patterns of cycle tests. Here, the design capacity of the battery was 1 CmAh.

First Pattern (Ordinary Cycle Test)
(1) constant current charge (45° C.): 0.7 CmA (cut-off voltage 4.2 V)
(2) constant voltage charge (45° C.): 4.2 V (cut-off current 0.05 CmA)
(3) charge rest (45° C.): 30 minutes
(4) constant current discharge (45° C.): 1 CmA (cut-off voltage 2.5 V)
(5) discharge rest (45° C.): 30 minutes Second Pattern (Intermittent Cycle Test)
(1) constant current charge (45° C.): 0.7 CmA (cut-off voltage 4.2 V)
(2) constant voltage charge (45° C.): 4.2 V (cut-off current 0.05 CmA)
(3) charge rest (45° C.): 720 minutes
(4) constant current discharge (45° C.): 1 CmA (cut-off voltage 2.5 V)
(5) discharge rest (45° C.): 720 minutes Discharge capacities obtained after 500 cycles of first and second patterns were shown in Tables 1 to 22.

TABLE 1

|  | Coupling agent | Stabilizer | Intermittent cycle characteristic | |
|---|---|---|---|---|
|  |  |  | Charge/Discharge rest 30 min. Discharge rate 1 CmA at 45° C. (mAh) | Charge/Discharge rest 720 min. Discharge rate 1 CmA at 45° C. (mAh) |
| Example A1 | 3-mercaptopropyl-trimethoxysilane | LiOH aqueous solution | 2001 | 1500 |
| Example A2 |  | NaOH aqueous solution | 2000 | 1502 |
| Example A3 |  | KOH aqueous solution | 1999 | 1505 |
| Example A4 |  | ethyl acetoacetate (β-diketone) | 2000 | 1499 |
| Example A5 |  | 2,4-pentadion (β-diketone) | 2001 | 1502 |
| Example A6 |  | triethanol amine | 2002 | 1500 |
| Example A7 |  | 2-amino-2-methyl-1-propanol | 2003 | 1498 |
| Example A8 |  | 4-hydroxy-2-butanone | 1999 | 1499 |
| Example A9 |  | 3-hydroxy-2-pentanone | 2001 | 1500 |
| Example A10 |  | 1-phenyl-1-oxo-2-hydroxypropane | 2000 | 1497 |
| Example A11 |  | maleic anhydride (acid anhydride) | 2002 | 1497 |
| Example A12 |  | phthalic anhydride (acid anhydride) | 2002 | 1502 |
| Example A13 |  | fumaric anhydride (acid anhydride) | 2000 | 1502 |
| Example A14 |  | trimethylchlorosilane (silylating agent) | 2001 | 1499 |
| Example A15 |  | tripentylchlorosilane (silylating agent) | 1999 | 1502 |
| Comparative Example A1 |  | none | 2002 | 802 |

EXAMPLE 2

Batteries B1 to B15 were produced and evaluated in the same manner as in Batteries A1 to A15 of Example 1 except that 3-methacryloxypropyltrimethoxysilane was used as a coupling agent instead of 3-mercaptopropyltrimethoxysilane. The results are shown in Table 2.

EXAMPLE 3

Batteries C1 to C15 were produced and evaluated in the same manner as in Batteries A1 to A15 of Example 1 except that 3,3,3-trifluoropropyltrichlorosilane was used as a coupling agent instead of 3-mercaptopropyltrimethoxysilane. The results are shown in Table 3.

TABLE 2

|  | Coupling agent | Stabilizer | Intermittent cycle characteristic | |
|---|---|---|---|---|
|  |  |  | Charge/Discharge rest 30 min. Discharge rate 1 CmA at 45° C. (mAh) | Charge/Discharge rest 720 min. Discharge rate 1 CmA at 45° C. (mAh) |
| Example B1 | 3-methacryloxypropyl-trimethoxysilane | LiOH aqueous solution | 2001 | 1500 |
| Example B2 |  | NaOH aqueous solution | 2002 | 1500 |
| Example B3 |  | KOH aqueous solution | 2001 | 1502 |
| Example B4 |  | ethyl acetoacetate (β-diketone) | 1999 | 1503 |
| Example B5 |  | 2,4-pentadion (β-diketone) | 2000 | 1499 |
| Example B6 |  | triethanol amine | 2001 | 1498 |
| Example B7 |  | 2-amino-2-methyl-1-propanol | 2001 | 1497 |
| Example B8 |  | 4-hydroxy-2-butanone | 2002 | 1500 |
| Example B9 |  | 3-hydroxy-2-pentanone | 2000 | 1510 |
| Example B10 |  | 1-phenyl-1-oxo-2-hydroxypropane | 1999 | 1509 |
| Example B11 |  | maleic anhydride (acid anhydride) | 1998 | 1508 |
| Example B12 |  | phthalic anhydride (acid anhydride) | 1997 | 1507 |
| Example B13 |  | fumaric anhydride (acid anhydride) | 2000 | 1500 |
| Example B14 |  | trimethylchlorosilane (silylating agent) | 2001 | 1503 |
| Example B15 |  | tripentylchlorosilane (silylating agent) | 2002 | 1505 |
| Comparative Example B1 |  | none | 2001 | 800 |

TABLE 3

| | Coupling agent | Stabilizer | Intermittent cycle characteristic | |
|---|---|---|---|---|
| | | | Charge/Discharge rest 30 min. Discharge rate 1 CmA at 45° C. (mAh) | Charge/Discharge rest 720 min. Discharge rate 1 CmA at 45° C. (mAh) |
| Example C1 | 3,3,3-trifluoropropyl-trichlorosilane | LiOH aqueous solution | 2003 | 1501 |
| Example C2 | | NaOH aqueous solution | 2000 | 1502 |
| Example C3 | | KOH aqueous solution | 1999 | 1508 |
| Example C4 | | ethyl acetoacetate (β-diketone) | 2000 | 1510 |
| Example C5 | | 2,4-pentadion (β-diketone) | 2001 | 1509 |
| Example C6 | | triethanol amine | 1999 | 1502 |
| Example C7 | | 2-amino-2-methyl-1-propanol | 1998 | 1501 |
| Example C8 | | 4-hydroxy-2-butanone | 2000 | 1504 |
| Example C9 | | 3-hydroxy-2-pentanone | 2001 | 1505 |
| Example C10 | | 1-phenyl-1-oxo-2-hydroxypropane | 2002 | 1507 |
| Example C11 | | maleic anhydride (acid anhydride) | 2003 | 1508 |
| Example C12 | | phthalic anhydride (acid anhydride) | 2000 | 1509 |
| Example C13 | | fumaric anhydride (acid anhydride) | 1999 | 1502 |
| Example C14 | | trimethylchlorosilane (silylating agent) | 1998 | 1500 |
| Example C15 | | tripentylchlorosilane (silylating agent) | 1999 | 1508 |
| Comparative Example C1 | | none | 2000 | 801 |

EXAMPLE 4

Batteries D1 to D15 were produced and evaluated in the same manner as in Batteries A1 to A15 of Example 1 except that 3,3,4,4,5,5,6,6,6-nonafluorohexyltrichlorosilane was used as a coupling agent instead of 3-mercaptopropyl-trimethoxysilane. The results are shown in Table 4.

EXAMPLE 5

Batteries E1 to E15 were produced and evaluated in the same manner as in Batteries A1 to A15 of Example 1 except that 3,3,3-trifluoropropyltrimethoxysilane was used as a coupling agent instead of 3-mercaptopropyltrimethoxysilane. The results are shown in Table 5.

TABLE 4

| | Coupling agent | Stabilizer | Intermittent cycle characteristic | |
|---|---|---|---|---|
| | | | Charge/Discharge rest 30 min. Discharge rate 1 CmA at 45° C. (mAh) | Charge/Discharge rest 720 min. Discharge rate 1 CmA at 45° C. (mAh) |
| Example D1 | 3,3,4,4,5,5,6,6,6-nonafluorohexyl-trichlorosilane | LiOH aqueous solution | 1999 | 1502 |
| Example D2 | | NaOH aqueous solution | 2001 | 1507 |
| Example D3 | | KOH aqueous solution | 1997 | 1500 |
| Example D4 | | ethyl acetoacetate (β-diketone) | 1997 | 1507 |
| Example D5 | | 2,4-pentadion (β-diketone) | 2002 | 1500 |
| Example D6 | | triethanol amine | 1999 | 1503 |
| Example D7 | | 2-amino-2-methyl-1-propanol | 2000 | 1504 |
| Example D8 | | 4-hydroxy-2-butanone | 2001 | 1503 |
| Example D9 | | 3-hydroxy-2-pentanone | 2002 | 1500 |
| Example D10 | | 1-phenyl-1-oxo-2-hydroxypropane | 1999 | 1508 |
| Example D11 | | maleic anhydride (acid anhydride) | 1998 | 1508 |
| Example D12 | | phthalic anhydride (acid anhydride) | 2000 | 1503 |
| Example D13 | | fumaric anhydride (acid anhydride) | 2001 | 1509 |
| Example D14 | | trimethylchlorosilane (silylating agent) | 2003 | 1508 |
| Example D15 | | tripentylchlorosilane (silylating agent) | 2001 | 1509 |
| Comparative Example D1 | | none | 2000 | 799 |

TABLE 5

|  | Coupling agent | Stabilizer | Intermittent cycle characteristic | |
|---|---|---|---|---|
|  |  |  | Charge/ Discharge rest 30 min. Discharge rate 1 CmA at 45° C. (mAh) | Charge/ Discharge rest 720 min. |
| Example E1 | 3,3,3-trifluoropropyl-trimethoxysilane | LiOH aqueous solution | 2003 | 1501 |
| Example E2 |  | NaOH aqueous solution | 1999 | 1503 |
| Example E3 |  | KOH aqueous solution | 2001 | 1502 |
| Example E4 |  | ethyl acetoacetate (β-diketone) | 2000 | 1502 |
| Example E5 |  | 2,4-pentadion (β-diketone) | 2001 | 1500 |
| Example E6 |  | triethanol amine | 2000 | 1500 |
| Example E7 |  | 2-amino-2-methyl-1-propanol | 2001 | 1500 |
| Example E8 |  | 4-hydroxy-2-butanone | 1999 | 1507 |
| Example E9 |  | 3-hydroxy-2-pentanone | 2001 | 1503 |
| Example E10 |  | 1-phenyl-1-oxo-2-hydroxypropane | 1999 | 1508 |
| Example E11 |  | maleic anhydride (acid anhydride) | 2001 | 1497 |
| Example E12 |  | phthalic anhydride (acid anhydride) | 2002 | 1507 |
| Example E13 |  | fumaric anhydride (acid anhydride) | 2000 | 1509 |
| Example E14 |  | trimethylchlorosilane (silylating agent) | 1998 | 1500 |
| Example E15 |  | tripentylchlorosilane (silylating agent) | 2000 | 1510 |
| Comparative Example E1 |  | none | 1999 | 800 |

EXAMPLE 6

Batteries F1 to F15 were produced and evaluated in the same manner as in Batteries A1 to A15 of Example 1 except that hexyltrimethoxysilane was used as a coupling agent instead of 3-mercaptopropyltrimethoxysilane. The results are shown in Table 6.

EXAMPLE 7

Batteries G1 to G15 were produced and evaluated in the same manner as in Batteries A1 to A15 of Example 1 except that decyltrichlorosilane was used as a coupling agent instead of 3-mercaptopropyltrimethoxysilane. The results are shown in Table 7.

TABLE 6

|  | Coupling agent | Stabilizer | Intermittent cycle characteristic | |
|---|---|---|---|---|
|  |  |  | Charge/ Discharge rest 30 min. Discharge rate 1 CmA at 45° C. (mAh) | Charge/ Discharge rest 720 min. |
| Example F1 | hexyl-trimethoxysilane | LiOH aqueous solution | 1999 | 1502 |
| Example F2 |  | NaOH aqueous solution | 1999 | 1508 |
| Example F3 |  | KOH aqueous solution | 2002 | 1500 |
| Example F4 |  | ethyl acetoacetate (β-diketone) | 1998 | 1508 |
| Example F5 |  | 2,4-pentadion (β-diketone) | 2003 | 1501 |
| Example F6 |  | triethanol amine | 2002 | 1500 |
| Example F7 |  | 2-amino-2-methyl-1-propanol | 2001 | 1505 |
| Example F8 |  | 4-hydroxy-2-butanone | 2001 | 1497 |
| Example F9 |  | 3-hydroxy-2-pentanone | 1998 | 1501 |
| Example F10 |  | 1-phenyl-1-oxo-2-hydroxypropane | 2001 | 1503 |
| Example F11 |  | maleic anhydride (acid anhydride) | 2001 | 1500 |
| Example F12 |  | phthalic anhydride (acid anhydride) | 2003 | 1508 |
| Example F13 |  | fumaric anhydride (acid anhydride) | 1999 | 1503 |
| Example F14 |  | trimethylchlorosilane (silylating agent) | 2000 | 1510 |
| Example F15 |  | tripentylchlorosilane (silylating agent) | 2000 | 1503 |
| Comparative Example F1 |  | none | 2002 | 800 |

TABLE 7

| | Coupling agent | Stabilizer | Intermittent cycle characteristic | |
|---|---|---|---|---|
| | | | Charge/Discharge rest 30 min. Discharge rate 1 CmA at 45° C. (mAh) | Charge/Discharge rest 720 min. Discharge rate 1 CmA at 45° C. (mAh) |
| Example G1 | decyltrichlorosilane | LiOH aqueous solution | 2001 | 1503 |
| Example G2 | | NaOH aqueous solution | 2000 | 1507 |
| Example G3 | | KOH aqueous solution | 2000 | 1510 |
| Example G4 | | ethyl acetoacetate (β-diketone) | 1999 | 1509 |
| Example G5 | | 2,4-pentadion (β-diketone) | 2000 | 1509 |
| Example G6 | | triethanol amine | 1997 | 1500 |
| Example G7 | | 2-amino-2-methyl-1-propanol | 1998 | 1502 |
| Example G8 | | 4-hydroxy-2-butanone | 1999 | 1502 |
| Example G9 | | 3-hydroxy-2-pentanone | 2002 | 1500 |
| Example G10 | | 1-phenyl-1-oxo-2-hydroxypropane | 2000 | 1503 |
| Example G11 | | maleic anhydride (acid anhydride) | 2001 | 1502 |
| Example G12 | | phthalic anhydride (acid anhydride) | 2001 | 1498 |
| Example G13 | | fumaric anhydride (acid anhydride) | 1998 | 1500 |
| Example G14 | | trimethylchlorosilane (silylating agent) | 1999 | 1507 |
| Example G15 | | tripentylchlorosilane (silylating agent) | 1999 | 1508 |
| Comparative Example G1 | | none | 2001 | 800 |

EXAMPLE 8

Batteries H1 to H15 were produced and evaluated in the same manner as in Batteries A1 to A15 of Example 1 except that 6-triethoxysilyl-2-norbornane was used as a coupling agent instead of 3-mercaptopropyltrimethoxysilane. The results are shown in Table 8.

EXAMPLE 9

Batteries I1 to I15 were produced and evaluated in the same manner as in Batteries A1 to A15 of Example 1 except that 3-methacryloxypropyltrimethoxysilane was used as a coupling agent instead of 3-mercaptopropyltrimethoxysilane. The results are shown in Table 9.

TABLE 8

| | Coupling agent | Stabilizer | Intermittent cycle characteristic | |
|---|---|---|---|---|
| | | | Charge/Discharge rest 30 min. Discharge rate 1 CmA at 45° C. (mAh) | Charge/Discharge rest 720 min. Discharge rate 1 CmA at 45° C. (mAh) |
| Example H1 | 6-triethoxysilyl-2-norbornene | LiOH aqueous solution | 1998 | 1501 |
| Example H2 | | NaOH aqueous solution | 2000 | 1503 |
| Example H3 | | KOH aqueous solution | 1999 | 1503 |
| Example H4 | | ethyl acetoacetate (β-diketone) | 1999 | 1508 |
| Example H5 | | 2,4-pentadion (β-diketone) | 2002 | 1500 |
| Example H6 | | triethanol amine | 2001 | 1503 |
| Example H7 | | 2-amino-2-methyl-1-propanol | 2000 | 1500 |
| Example H8 | | 4-hydroxy-2-butanone | 1999 | 1502 |
| Example H9 | | 3-hydroxy-2-pentanone | 2002 | 1500 |
| Example H10 | | 1-phenyl-1-oxo-2-hydroxypropane | 2000 | 1504 |
| Example H11 | | maleic anhydride (acid anhydride) | 2001 | 1500 |
| Example H12 | | phthalic anhydride (acid anhydride) | 1999 | 1503 |
| Example H13 | | fumaric anhydride (acid anhydride) | 2000 | 1510 |
| Example H14 | | trimethylchlorosilane (silylating agent) | 2001 | 1498 |
| Example H15 | | tripentylchlorosilane (silylating agent) | 2000 | 1509 |
| Comparative Example H1 | | none | 2001 | 798 |

TABLE 9

| | Coupling agent | Stabilizer | Intermittent cycle characteristic Charge/ Discharge rest 30 min. Discharge rate 1 CmA at 45° C. (mAh) | Charge/ Discharge rest 720 min. |
|---|---|---|---|---|
| Example I1 | 3-methacryloxypropyl-trimethoxysilane | LiOH aqueous solution | 2002 | 1500 |
| Example I2 | | NaOH aqueous solution | 2001 | 1497 |
| Example I3 | | KOH aqueous solution | 1999 | 1502 |
| Example I4 | | ethyl acetoacetate (β-diketone) | 2001 | 1509 |
| Example I5 | | 2,4-pentadion (β-diketone) | 2001 | 1502 |
| Example I6 | | triethanol amine | 1997 | 1500 |
| Example I7 | | 2-amino-2-methyl-1-propanol | 2002 | 1507 |
| Example I8 | | 4-hydroxy-2-butanone | 2000 | 1507 |
| Example I9 | | 3-hydroxy-2-pentanone | 1998 | 1500 |
| Example I10 | | 1-phenyl-1-oxo-2-hydroxypropane | 1998 | 1502 |
| Example I11 | | maleic anhydride (acid anhydride) | 1997 | 1507 |
| Example I12 | | phthalic anhydride (acid anhydride) | 2001 | 1509 |
| Example I13 | | fumaric anhydride (acid anhydride) | 2003 | 1501 |
| Example I14 | | trimethylchlorosilane (silylating agent) | 1999 | 1509 |
| Example I15 | | tripentylchlorosilane (silylating agent) | 2002 | 1505 |
| Comparative Example I1 | | none | 2001 | 799 |

EXAMPLE 10

Batteries J1 to J15 were produced and evaluated in the same manner as in Batteries A1 to A15 of Example 1 except that dodecyltriethoxysilane was used as a coupling agent instead of 3-mercaptopropyltrimethoxysilane. The results are shown in Table 10.

EXAMPLE 11

Batteries K1 to K15 were produced and evaluated in the same manner as in Batteries A1 to A15 of Example 1 except that dimethoxymethylchlorosilane was used as a coupling agent instead of 3-mercaptopropyltrimethoxysilane. The results are shown in Table 11.

TABLE 10

| | Coupling agent | Stabilizer | Intermittent cycle characteristic Charge/ Discharge rest 30 min. Discharge rate 1 CmA at 45° C. (mAh) | Charge/ Discharge rest 720 min. |
|---|---|---|---|---|
| Example J1 | dodecyl-triethoxysilane | LiOH aqueous solution | 2000 | 1500 |
| Example J2 | | NaOH aqueous solution | 2000 | 1507 |
| Example J3 | | KOH aqueous solution | 1997 | 1500 |
| Example J4 | | ethyl acetoacetate (β-diketone) | 1999 | 1508 |
| Example J5 | | 2,4-pentadion (β-diketone) | 2002 | 1500 |
| Example J6 | | triethanol amine | 1999 | 1508 |
| Example J7 | | 2-amino-2-methyl-1-propanol | 1997 | 1507 |
| Example J8 | | 4-hydroxy-2-butanone | 2001 | 1505 |
| Example J9 | | 3-hydroxy-2-pentanone | 2001 | 1503 |
| Example J10 | | 1-phenyl-1-oxo-2-hydroxypropane | 2002 | 1505 |
| Example J11 | | maleic anhydride (acid anhydride) | 1998 | 1508 |
| Example J12 | | phthalic anhydride (acid anhydride) | 2003 | 1501 |
| Example J13 | | fumaric anhydride (acid anhydride) | 1999 | 1503 |
| Example J14 | | trimethylchlorosilane (silylating agent) | 2000 | 1509 |
| Example J15 | | tripentylchlorosilane (silylating agent) | 2000 | 1510 |
| Comparative Example J1 | | none | 2000 | 795 |

TABLE 11

| | Coupling agent | Stabilizer | Intermittent cycle characteristic Charge/Discharge rest 30 min. Discharge rate 1 CmA at 45° C. (mAh) | Charge/Discharge rest 720 min. Discharge rate 1 CmA at 45° C. (mAh) |
|---|---|---|---|---|
| Example K1 | Dimethoxymethyl-chlorosilane | LiOH aqueous solution | 2002 | 1500 |
| Example K2 | | NaOH aqueous solution | 2000 | 1503 |
| Example K3 | | KOH aqueous solution | 2001 | 1500 |
| Example K4 | | ethyl acetoacetate (β-diketone) | 1999 | 1502 |
| Example K5 | | 2,4-pentadion (β-diketone) | 2000 | 1504 |
| Example K6 | | triethanol amine | 2001 | 1509 |
| Example K7 | | 2-amino-2-methyl-1-propanol | 2001 | 1502 |
| Example K8 | | 4-hydroxy-2-butanone | 2001 | 1503 |
| Example K9 | | 3-hydroxy-2-pentanone | 1999 | 1503 |
| Example K10 | | 1-phenyl-1-oxo-2-hydroxypropane | 1999 | 1509 |
| Example K11 | | maleic anhydride (acid anhydride) | 2001 | 1500 |
| Example K12 | | phthalic anhydride (acid anhydride) | 2002 | 1507 |
| Example K13 | | fumaric anhydride (acid anhydride) | 1998 | 1501 |
| Example K14 | | trimethylchlorosilane (silylating agent) | 2003 | 1508 |
| Example K15 | | tripentylchlorosilane (silylating agent) | 2001 | 1507 |
| Comparative Example K1 | | none | 2002 | 800 |

EXAMPLE 12

Batteries L1 to L15 were produced and evaluated in the same manner as in Batteries A1 to A15 of Example 1 except that 3-mercaptopropylmethyldimethoxysilane was used as a coupling agent instead of 3-mercaptopropyltrimethoxysilane. The results are shown in Table 12.

EXAMPLE 13

Batteries M1 to M15 were produced and evaluated in the same manner as in Batteries A1 to A15 of Example 1 except that 3,3,3-trifluoropropylmethyldichlorosilane was used as a coupling agent instead of 3-mercaptopropyltrimethoxysilane. The results are shown in Table 13.

TABLE 12

| | Coupling agent | Stabilizer | Intermittent cycle characteristic Charge/Discharge rest 30 min. Discharge rate 1 CmA at 45° C. (mAh) | Charge/Discharge rest 720 min. Discharge rate 1 CmA at 45° C. (mAh) |
|---|---|---|---|---|
| Example L1 | 3-mercaptopropyl-methyldimethoxy-silane | LiOH aqueous solution | 1999 | 1502 |
| Example L2 | | NaOH aqueous solution | 2000 | 1510 |
| Example L3 | | KOH aqueous solution | 2002 | 1505 |
| Example L4 | | ethyl acetoacetate (β-diketone) | 1997 | 1507 |
| Example L5 | | 2,4-pentadion (β-diketone) | 2002 | 1500 |
| Example L6 | | triethanol amine | 2000 | 1504 |
| Example L7 | | 2-amino-2-methyl-1-propanol | 2003 | 1508 |
| Example L8 | | 4-hydroxy-2-butanone | 2002 | 1500 |
| Example L9 | | 3-hydroxy-2-pentanone | 1998 | 1501 |
| Example L10 | | 1-phenyl-1-oxo-2-hydroxypropane | 2001 | 1503 |
| Example L11 | | maleic anhydride (acid anhydride) | 1998 | 1508 |
| Example L12 | | phthalic anhydride (acid anhydride) | 1997 | 1500 |
| Example L13 | | fumaric anhydride (acid anhydride) | 1999 | 1507 |
| Example L14 | | trimethylchlorosilane (silylating agent) | 1999 | 1508 |
| Example L15 | | tripentylchlorosilane (silylating agent) | 1998 | 1500 |
| Comparative Example L1 | | none | 2001 | 802 |

TABLE 13

| | Coupling agent | Stabilizer | Intermittent cycle characteristic | |
|---|---|---|---|---|
| | | | Charge/Discharge rest 30 min. Discharge rate 1 CmA at 45° C. (mAh) | Charge/Discharge rest 720 min. Discharge rate 1 CmA at 45° C. (mAh) |
| Example M1 | 3,3,3-trifluoropropyl-methyldichlorosilane | LiOH aqueous solution | 1999 | 1509 |
| Example M2 | | NaOH aqueous solution | 2001 | 1497 |
| Example M3 | | KOH aqueous solution | 2000 | 1507 |
| Example M4 | | ethyl acetoacetate (β-diketone) | 2001 | 1507 |
| Example M5 | | 2,4-pentadion (β-diketone) | 1999 | 1503 |
| Example M6 | | triethanol amine | 1999 | 1502 |
| Example M7 | | 2-amino-2-methyl-1-propanol | 2001 | 1498 |
| Example M8 | | 4-hydroxy-2-butanone | 2001 | 1500 |
| Example M9 | | 3-hydroxy-2-pentanone | 2000 | 1500 |
| Example M10 | | 1-phenyl-1-oxo-2-hydroxypropane | 2002 | 1507 |
| Example M11 | | maleic anhydride (acid anhydride) | 2000 | 1502 |
| Example M12 | | phthalic anhydride (acid anhydride) | 2003 | 1501 |
| Example M13 | | fumaric anhydride (acid anhydride) | 1998 | 1502 |
| Example M14 | | trimethylchlorosilane (silylating agent) | 2001 | 1509 |
| Example M15 | | tripentylchlorosilane (silylating agent) | 2000 | 1510 |
| Comparative Example M1 | | none | 2001 | 800 |

EXAMPLE 14

Batteries N1 to N15 were produced and evaluated in the same manner as in Batteries A1 to A15 of Example 1 except that diethoxydichlorosilane was used as a coupling agent instead of 3-mercaptopropyltrimethoxysilane. The results are shown in Table 14.

EXAMPLE 15

Batteries O1 to O15 were produced and evaluated in the same manner as in Batteries A1 to A15 of Example 1 except that 3,3,3-trifluoropropylmethyldimethoxysilane was used as a coupling agent instead of 3-mercaptopropyltrimethoxysilane. The results are shown in Table 15.

TABLE 14

| | Coupling agent | Stabilizer | Intermittent cycle characteristic | |
|---|---|---|---|---|
| | | | Charge/Discharge rest 30 min. Discharge rate 1 CmA at 45° C. (mAh) | Charge/Discharge rest 720 min. Discharge rate 1 CmA at 45° C. (mAh) |
| Example N1 | diethoxy-dichlorosilane | LiOH aqueous solution | 2002 | 1507 |
| Example N2 | | NaOH aqueous solution | 2003 | 1508 |
| Example N3 | | KOH aqueous solution | 2000 | 1509 |
| Example N4 | | ethyl acetoacetate (β-diketone) | 1998 | 1500 |
| Example N5 | | 2,4-pentadion (β-diketone) | 2000 | 1503 |
| Example N6 | | triethanol amine | 1999 | 1503 |
| Example N7 | | 2-amino-2-methyl-1-propanol | 2001 | 1502 |
| Example N8 | | 4-hydroxy-2-butanone | 1999 | 1508 |
| Example N9 | | 3-hydroxy-2-pentanone | 1998 | 1508 |
| Example N10 | | 1-phenyl-1-oxo-2-hydroxypropane | 2001 | 1505 |
| Example N11 | | maleic anhydride (acid anhydride) | 2001 | 1498 |
| Example N12 | | phthalic anhydride (acid anhydride) | 1999 | 1509 |
| Example N13 | | fumaric anhydride (acid anhydride) | 2002 | 1505 |
| Example N14 | | trimethylchlorosilane (silylating agent) | 2001 | 1503 |
| Example N15 | | tripentylchlorosilane (silylating agent) | 1997 | 1507 |
| Comparative Example N1 | | none | 2001 | 797 |

TABLE 15

| | Coupling agent | Stabilizer | Intermittent cycle characteristic Charge/Discharge rest 30 min. Discharge rate 1 CmA at 45° C. (mAh) | Charge/Discharge rest 720 min. Discharge rate 1 CmA at 45° C. (mAh) |
|---|---|---|---|---|
| Example O1 | 3,3,3-trifluoropropyl-methyldimethoxy-silane | LiOH aqueous solution | 2001 | 1509 |
| Example O2 | | NaOH aqueous solution | 1999 | 1507 |
| Example O3 | | KOH aqueous solution | 2000 | 1503 |
| Example O4 | | ethyl acetoacetate (β-diketone) | 1997 | 1500 |
| Example O5 | | 2,4-pentadion (β-diketone) | 2000 | 1500 |
| Example O6 | | triethanol amine | 2000 | 1504 |
| Example O7 | | 2-amino-2-methyl-1-propanol | 2000 | 1499 |
| Example O8 | | 4-hydroxy-2-butanone | 2002 | 1500 |
| Example O9 | | 3-hydroxy-2-pentanone | 1999 | 1503 |
| Example O10 | | 1-phenyl-1-oxo-2-hydroxypropane | 1999 | 1502 |
| Example O11 | | maleic anhydride (acid anhydride) | 1998 | 1501 |
| Example O12 | | phthalic anhydride (acid anhydride) | 2001 | 1509 |
| Example O13 | | fumaric anhydride (acid anhydride) | 2000 | 1510 |
| Example O14 | | trimethylchlorosilane (silylating agent) | 2002 | 1500 |
| Example O15 | | tripentylchlorosilane (silylating agent) | 2000 | 1510 |
| Comparative Example O1 | | none | 2002 | 800 |

EXAMPLE 16

Batteries P1 to P15 were produced and evaluated in the same manner as in Batteries A1 to A15 of Example 1 except that 2-(3,4-epoxycyclohexyl)ethyltrimethoxysilane was used as a coupling agent instead of 3-mercaptopropyltrimethoxysilane. The results are shown in Table 16.

EXAMPLE 17

Batteries Q1 to Q15 were produced and evaluated in the same manner as in Batteries A1 to A15 of Example 1 except that docosylmethyldichlorosilane was used as a coupling agent instead of 3-mercaptopropyltrimethoxysilane. The results are shown in Table 17.

TABLE 16

| | Coupling agent | Stabilizer | Intermittent cycle characteristic Charge/Discharge rest 30 min. Discharge rate 1 CmA at 45° C. (mAh) | Charge/Discharge rest 720 min. Discharge rate 1 CmA at 45° C. (mAh) |
|---|---|---|---|---|
| Example P1 | 2-(3,4-epoxycyclohexyl)-ethyltrimethoxysilane | LiOH aqueous solution | 2001 | 1507 |
| Example P2 | | NaOH aqueous solution | 2002 | 1500 |
| Example P3 | | KOH aqueous solution | 2002 | 1507 |
| Example P4 | | ethyl acetoacetate (β-diketone) | 1997 | 1507 |
| Example P5 | | 2,4-pentadion (β-diketone) | 2003 | 1501 |
| Example P6 | | triethanol amine | 2001 | 1505 |
| Example P7 | | 2-amino-2-methyl-1-propanol | 2001 | 1500 |
| Example P8 | | 4-hydroxy-2-butanone | 2002 | 1500 |
| Example P9 | | 3-hydroxy-2-pentanone | 2001 | 1503 |
| Example P10 | | 1-phenyl-1-oxo-2-hydroxypropane | 2000 | 1503 |
| Example P11 | | maleic anhydride (acid anhydride) | 2001 | 1498 |
| Example P12 | | phthalic anhydride (acid anhydride) | 2000 | 1510 |
| Example P13 | | fumaric anhydride (acid anhydride) | 1999 | 1503 |
| Example P14 | | trimethylchlorosilane (silylating agent) | 2000 | 1504 |
| Example P15 | | tripentylchlorosilane (silylating agent) | 2001 | 1509 |
| Comparative Example P1 | | none | 2001 | 798 |

TABLE 17

| | Coupling agent | Stabilizer | Intermittent cycle characteristic | |
|---|---|---|---|---|
| | | | Charge/Discharge rest 30 min. Discharge rate 1 CmA at 45° C. (mAh) | Charge/Discharge rest 720 min. Discharge rate 1 CmA at 45° C. (mAh) |
| Example Q1 | docosylmethyl-dichlorosilane | LiOH aqueous solution | 1999 | 1503 |
| Example Q2 | | NaOH aqueous solution | 2001 | 1500 |
| Example Q3 | | KOH aqueous solution | 2001 | 1497 |
| Example Q4 | | ethyl acetoacetate (β-diketone) | 2000 | 1503 |
| Example Q5 | | 2,4-pentadion (β-diketone) | 1998 | 1508 |
| Example Q6 | | triethanol amine | 2002 | 1505 |
| Example Q7 | | 2-amino-2-methyl-1-propanol | 2000 | 1510 |
| Example Q8 | | 4-hydroxy-2-butanone | 1999 | 1502 |
| Example Q9 | | 3-hydroxy-2-pentanone | 1998 | 1500 |
| Example Q10 | | 1-phenyl-1-oxo-2-hydroxypropane | 2000 | 1507 |
| Example Q11 | | maleic anhydride (acid anhydride) | 2000 | 1502 |
| Example Q12 | | phthalic anhydride (acid anhydride) | 2001 | 1503 |
| Example Q13 | | fumaric anhydride (acid anhydride) | 1999 | 1508 |
| Example Q14 | | trimethylchlorosilane (silylating agent) | 1999 | 1509 |
| Example Q15 | | tripentylchlorosilane (silylating agent) | 2002 | 1500 |
| Comparative Example Q1 | | none | 2001 | 799 |

EXAMPLE 18

Batteries R1 to R15 were produced and evaluated in the same manner as in Batteries A1 to A15 of Example 1 except that dimethyldichlorosilane was used as a coupling agent instead of 3-mercaptopropyltrimethoxysilane. The results are shown in Table 18.

EXAMPLE 19

Batteries S1 to S15 were produced and evaluated in the same manner as in Batteries A1 to A15 of Example 1 except that dimethyldimethoxysilane was used as a coupling agent instead of 3-mercaptopropyltrimethoxysilane. The results are shown in Table 19.

TABLE 18

| | Coupling agent | Stabilizer | Intermittent cycle characteristic | |
|---|---|---|---|---|
| | | | Charge/Discharge rest 30 min. Discharge rate 1 CmA at 45° C. (mAh) | Charge/Discharge rest 720 min. Discharge rate 1 CmA at 45° C. (mAh) |
| Example R1 | dimethyldichloro-silane | LiOH aqueous solution | 2001 | 1500 |
| Example R2 | | NaOH aqueous solution | 2000 | 1504 |
| Example R3 | | KOH aqueous solution | 2001 | 1507 |
| Example R4 | | ethyl acetoacetate (β-diketone) | 2000 | 1510 |
| Example R5 | | 2,4-pentadion (β-diketone) | 2000 | 1500 |
| Example R6 | | triethanol amine | 2001 | 1509 |
| Example R7 | | 2-amino-2-methyl-1-propanol | 1998 | 1508 |
| Example R8 | | 4-hydroxy-2-butanone | 1997 | 1500 |
| Example R9 | | 3-hydroxy-2-pentanone | 1999 | 1503 |
| Example R10 | | 1-phenyl-1-oxo-2-hydroxypropane | 1999 | 1507 |
| Example R11 | | maleic anhydride (acid anhydride) | 2001 | 1497 |
| Example R12 | | phthalic anhydride (acid anhydride) | 2002 | 1507 |
| Example R13 | | fumaric anhydride (acid anhydride) | 2001 | 1503 |
| Example R14 | | trimethylchlorosilane (silylating agent) | 1999 | 1502 |
| Example R15 | | tripentylchlorosilane (silylating agent) | 2001 | 1509 |
| Comparative Example R1 | | none | 1998 | 797 |

TABLE 19

| | Coupling agent | Stabilizer | Intermittent cycle characteristic | |
|---|---|---|---|---|
| | | | Charge/Discharge rest 30 min. Discharge rate 1 CmA at 45° C. (mAh) | Charge/Discharge rest 720 min. Discharge rate 1 CmA at 45° C. (mAh) |
| Example S1 | dimethyldimethoxysilane | LiOH aqueous solution | 2002 | 1505 |
| Example S2 | | NaOH aqueous solution | 2000 | 1510 |
| Example S3 | | KOH aqueous solution | 1999 | 1503 |
| Example S4 | | ethyl acetoacetate (β-diketone) | 2001 | 1500 |
| Example S5 | | 2,4-pentadion (β-diketone) | 2003 | 1501 |
| Example S6 | | triethanol amine | 2001 | 1505 |
| Example S7 | | 2-amino-2-methyl-1-propanol | 1999 | 1508 |
| Example S8 | | 4-hydroxy-2-butanone | 1997 | 1507 |
| Example S9 | | 3-hydroxy-2-pentanone | 2001 | 1498 |
| Example S10 | | 1-phenyl-1-oxo-2-hydroxypropane | 2003 | 1508 |
| Example S11 | | maleic anhydride (acid anhydride) | 2000 | 1499 |
| Example S12 | | phthalic anhydride (acid anhydride) | 2001 | 1502 |
| Example S13 | | fumaric anhydride (acid anhydride) | 1998 | 1501 |
| Example S14 | | trimethylchlorosilane (silylating agent) | 2002 | 1500 |
| Example S15 | | tripentylchlorosilane (silylating agent) | 1999 | 1502 |
| Comparative Example S1 | | none | 2000 | 795 |

EXAMPLE 20

Batteries T1 to T15 were produced and evaluated in the same manner as in Batteries A1 to A15 of Example 1 except that methyltrimethoxysilane was used as a coupling agent instead of 3-mercaptopropyltrimethoxysilane. The results are shown in Table 20.

EXAMPLE 21

Batteries U1 to U15 were produced and evaluated in the same manner as in Batteries A1 to A15 of Example 1 except that diethoxymethyloctadecylsilane was used as a coupling agent instead of 3-mercaptopropyltrimethoxysilane. The results are shown in Table 21.

TABLE 20

| | Coupling agent | Stabilizer | Intermittent cycle characteristic | |
|---|---|---|---|---|
| | | | Charge/Discharge rest 30 min. Discharge rate 1 CmA at 45° C. (mAh) | Charge/Discharge rest 720 min. Discharge rate 1 CmA at 45° C. (mAh) |
| Example T1 | methyltrimethoxysilane | LiOH aqueous solution | 2002 | 1500 |
| Example T2 | | NaOH aqueous solution | 1999 | 1502 |
| Example T3 | | KOH aqueous solution | 1998 | 1501 |
| Example T4 | | ethyl acetoacetate (β-diketone) | 2001 | 1503 |
| Example T5 | | 2,4-pentadion (β-diketone) | 2001 | 1503 |
| Example T6 | | triethanol amine | 1997 | 1500 |
| Example T7 | | 2-amino-2-methyl-1-propanol | 2000 | 1500 |
| Example T8 | | 4-hydroxy-2-butanone | 1999 | 1508 |
| Example T9 | | 3-hydroxy-2-pentanone | 2001 | 1497 |
| Example T10 | | 1-phenyl-1-oxo-2-hydroxypropane | 1998 | 1500 |
| Example T11 | | maleic anhydride (acid anhydride) | 2001 | 1505 |
| Example T12 | | phthalic anhydride (acid anhydride) | 2002 | 1500 |
| Example T13 | | fumaric anhydride (acid anhydride) | 1999 | 1508 |
| Example T14 | | trimethylchlorosilane (silylating agent) | 2001 | 1498 |
| Example T15 | | tripentylchlorosilane (silylating agent) | 2001 | 1509 |
| Comparative Example T1 | | none | 2002 | 800 |

TABLE 21

| | Coupling agent | Stabilizer | Intermittent cycle characteristic Charge/Discharge rest 30 min. Discharge rate 1 CmA at 45° C. (mAh) | Charge/Discharge rest 720 min. |
|---|---|---|---|---|
| Example U1 | diethoxymethyl-octadecylsilane | LiOH aqueous solution | 1998 | 1502 |
| Example U2 | | NaOH aqueous solution | 2000 | 1507 |
| Example U3 | | KOH aqueous solution | 2000 | 1499 |
| Example U4 | | ethyl acetoacetate (β-diketone) | 2000 | 1509 |
| Example U5 | | 2,4-pentadion (β-diketone) | 1999 | 1502 |
| Example U6 | | triethanol amine | 2002 | 1505 |
| Example U7 | | 2-amino-2-methyl-1-propanol | 2000 | 1510 |
| Example U8 | | 4-hydroxy-2-butanone | 2001 | 1500 |
| Example U9 | | 3-hydroxy-2-pentanone | 2000 | 1510 |
| Example U10 | | 1-phenyl-1-oxo-2-hydroxypropane | 1999 | 1507 |
| Example U11 | | maleic anhydride (acid anhydride) | 2001 | 1502 |
| Example U12 | | phthalic anhydride (acid anhydride) | 1999 | 1503 |
| Example U13 | | fumaric anhydride (acid anhydride) | 2000 | 1504 |
| Example U14 | | trimethylchlorosilane (silylating agent) | 2000 | 1502 |
| Example U15 | | tripentylchlorosilane (silylating agent) | 2001 | 1509 |
| Comparative Example U1 | | none | 2001 | 799 |

EXAMPLE 22

Batteries V1 to V15 were produced and evaluated in the same manner as in Batteries A1 to A15 of Example 1 except that diethoxydodecylmethylsilane was used as a coupling agent instead of 3-mercaptopropyltrimethoxysilane. The results are shown in Table 22.

TABLE 22

| | Coupling agent | Stabilizer | Intermittent cycle characteristic Charge/Discharge rest 30 min. Discharge rate 1 CmA at 45° C. (mAh) | Charge/Discharge rest 720 min. |
|---|---|---|---|---|
| Example V1 | diethoxydodecyl-methylsilane | LiOH aqueous solution | 1999 | 1502 |
| Example V2 | | NaOH aqueous solution | 2000 | 1500 |
| Example V3 | | KOH aqueous solution | 2000 | 1509 |
| Example V4 | | ethyl acetoacetate (β-diketone) | 2000 | 1510 |
| Example V5 | | 2,4-pentadion (β-diketone) | 1998 | 1502 |
| Example V6 | | triethanol amine | 2003 | 1501 |
| Example V7 | | 2-amino-2-methyl-1-propanol | 2002 | 1500 |
| Example V8 | | 4-hydroxy-2-butanone | 2001 | 1509 |
| Example V9 | | 3-hydroxy-2-pentanone | 1999 | 1507 |
| Example V10 | | 1-phenyl-1-oxo-2-hydroxypropane | 2000 | 1503 |
| Example V11 | | maleic anhydride (acid anhydride) | 2000 | 1503 |
| Example V12 | | phthalic anhydride (acid anhydride) | 1998 | 1501 |
| Example V13 | | fumaric anhydride (acid anhydride) | 2002 | 1505 |
| Example V14 | | trimethylchlorosilane (silylating agent) | 2001 | 1500 |
| Example V15 | | tripentylchlorosilane (silylating agent) | 2000 | 1499 |
| Comparative Example V1 | | none | 1998 | 800 |

COMPARATIVE EXAMPLE

Comparative Example Batteries A1, B1, C1, D1, E1, F1, G1, H1, I1, J1, K1, L1, M1, N1, O1, P1, Q1, R1, S1, T1, U1, and V1 were prepared and evaluated in the same manners as in Batteries A1, B1, C1, D1, E1, F1, G1, H1, I1, J1, K1, L1, M1, N1, O1, P1, Q1, R1, S1, T1, U1, and V1, respectively, except that a stabilizer was not used. The results are shown in Tables 1 to 22.

In the above Examples, described are cases in which nickel-cobalt-aluminum composite oxide was used as a lithium composite oxide. However, lithium composite oxides having the general formula (1) have the similar crystal structure as $LiCoO_2$ or $LiNiO_2$ and have the similar properties, and thus the same effects are considered to be obtained from them. In addition, in cases wherein lithium composite oxides contain Mn, Ti, Mg, Zr, Nb, Mo, W or Y instead of aluminum, it has been confirmed that the similar results are obtained.

The present invention is useful in lithium ion secondary batteries that contain as active materials for positive electrode lithium composite oxides having a main component of nickel or cobalt to further enhance cycle characteristic more than conventional one in a condition (e.g. intermittent cycle) closer to a practical use condition.

The shape of lithium ion secondary battery of the present invention is not particularly limited, and may be formed in any shape, for example, a coin shape, button shape, sheet shape, cylindrical shape, flat shape, and square shape. Further, either of a winding type or stacking type may be used as a configuration of electrode plate group comprising positive and negative electrodes and a separator. Furthermore, the size of the battery may be small for use in small portable devices or large for use in electric vehicles. Thus, the lithium ion secondary battery of the present invention can be used as power sources of, for example, personal digital assistants, portable electronic devices, small power storage facilities for household use, two-wheeled motor vehicles, electric vehicles, and hybrid electric vehicles. However, the use application is not particularly limited.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium ion secondary battery comprising a chargeable and dischargeable positive electrode, a chargeable and dischargeable negative electrode, and a non-aqueous electrolyte,
    the positive electrode including an active material particle,
    the active material particle including a reaction product of
        a lithium composite oxide,
            the lithium composite oxide being represented by the general formula (1):

$Li_xM_{1-y}L_yO_2$, where M is at least one selected from the group consisting of Ni and Co, and
L is at least one selected from the group of alkaline earth elements, transition elements other than Ni and Co, rare earth elements, and elements of Group IIIb and Group IVb, and where $0.85 \leq x \leq 1.25$ and $0 \leq y \leq 0.50$; and a coupling agent having a plurality of hydrolyzable groups and at least one functional group mercapto group, alkyl group, and fluorine atom, wherein the hydrolyzable group not forming a bond with the lithium composite oxide is reacted with a ligating compound having two or more reactive groups and each of said two or more reactive groups is hydroxyl group, carbonyl group, carboxyl group, or alkoxy group.

2. The lithium ion secondary battery according to claim 1, wherein $0<y$, and L includes at least one selected from the group consisting of Al, Mn, Ti, Mg, Zr, Nb, Mo, W and Y.

3. The lithium ion secondary battery according to claim 1, wherein the coupling agent is a silane coupling agent.

4. The lithium ion secondary battery according to claim 3, wherein at least one of the plurality of the hydrolyzable groups is at least one selected from the group consisting of alkoxy group and chlorine atom.

5. The lithium ion secondary battery according to claim 3, wherein the silane coupling agent binds to the lithium composite oxide via Si—O bond and forms a silicide compound on the surface of the active material particle.

6. The lithium ion secondary battery according to claim 1, wherein the amount of the coupling agent is 2% by weight or less with respect to the lithium composite oxide.

* * * * *